Patented Mar. 11, 1941

2,234,545

UNITED STATES PATENT OFFICE 2,234,545

MANUFACTURE OF VULCANIZED, MODIFIED FATTY OILS

László Auer, Jackson Heights, N. Y., assignor to J. Randolph Newman, Washington, D. C., as trustee No Drawing. Application October 24, 1938, Serial No. 236,800. In Hungary May 19, 1926

18 Claims. (Cl. 260—399)

This invention relates to the manufacture of vulcanized, modified organic isocolloids, particularly fatty oils. And it comprises two-step processes for making vulcanized, modified, heat-bodied fatty oils wherein the fatty oil is first heat-bodied in the presence of a minor amount of a polar compound, advantageously a metal salt or other electrolyte, by heating the fatty oil to polymerizing temperatures in the presence of a polar compound and continuing such heating until a modified, heat-bodied oil product is obtained, and wherein the modified heat-bodied oil product so obtained is subsequently vulcanized to further modify its properties and to further solidify it. As disclosed in my prior copending applications Serial No. 143,786, filed Oct. 23, 1926, and Serial No. 359,425, filed April 30, 1929, this two-step method is also applicable to the manufacture of vulcanized, modified products from other organic isocolloids containing unsaturated carbon compounds and capable of being altered by heating and of being vulcanized.

This application is in part a continuation of my said prior copending applications Serial No. 143,786, now Patent No. 2,189,772, and 359,425, and also of my prior copending application Ser. No. 446,172, filed April 21, 1930. Said application Ser. No. 359,425 is in turn a continuation-in-part of my prior applications Ser. No. 273,159, filed April 26, 1928, now Patent No. 1,985,230, and Ser. No. 273,160, filed April 26, 1928, now Patent No. 1,985,231. This application is also a continuation-in-part of my prior copending application Ser. No. 446,170 filed April 21, 1930.

As stated in my prior application Ser. No. 143,786, now Patent No. 2,189,772, it is well known that by heating fatty oils such as linseed oil, etc. to 200° C. or above for several hours, a particular type of bodied oil product is obtained. The bodied oil products so produced are known as "heat-bodied oils," "polymerized oils" or "stand oils;" the bodying or polymerization of the oil being caused by such heating, hence the name "heat-bodied" oil. That is, the heat-bodying of a fatty oil involves heating the oil to polymerizing temperatures and continuing such heating until the oil is sufficiently polymerized to substantially increase its body or viscosity. As is also well known, as the heat-bodied oils so obtained have a characteristic internal structure and other properties. As stated in my Patent No. 1,985,231 (issued Dec. 25, 1934, on my aforesaid application Ser. No. 273,160), polymerized linseed oil (linseed stand oil) is representative of this distinctive commercial class of bodied oil product. As there stated, the heat-bodied oils are much more viscous than the raw oil and may be semi-solid or solid at room temperatures.

In my copending application Ser. No. 143,786 mentioned ante, I have described processes for the modification of the physical properties of natural and artificial isocolloids containing unsaturated carbon compounds by heating them with "electrolytes," under which term are included salts of inorganic and organic acids, certain organic acids and metallic derivatives of organic compounds, with or without a simultaneous or subsequent treatment with gases at reduced, ordinary or increased pressure. The products obtained were from liquids, solid or semi-solid thermoplastic masses and from solids, harder solids or pasty or thin liquids. These products find application in the rubber, linoleum, varnish, soap and candle and other industries.

As described in my copending application Ser. No. 359,425, further investigation has enabled me to indicate some special features of particular series of examples of the main invention, and to add valuable groups of modifying agents which are active in bringing about the changes described; all of which is fully described in the said application. That is, I have found that in the following series of oils, viz., tung oil, linseed oil, castor oil, fish oil (train oils), poppy-seed oil, sunflower oil, rapeseed oil, walnut oil, pine oil, corn oil, olive oil, the ease of transformation under equal conditions decreased in the order given; the first mentioned oils are most rapidly attacked and give the hardest final product whilst the oil at the end of the series are attacked more slowly and give less solid products. It should, however, be mentioned that by employment of suitable modifying agents hard products can be obtained even from the last-mentioned oils. If, for example, castor oil is heated for five hours at 270°–290° C. under an absolute pressure of one inch of mercury with 5 per cent of its own weight of sodium bicarbonate, a solid product is obtained, whereas if olive oil be employed the product has a vaseline like consistency. If, however, olive oil is heated under the same conditions with a mixture of 5 per cent of its weight of sodium bicarbonate plus an equal weight of barium peroxide, the product approximates that obtained by heating castor oil with 3 per cent of its weight of sodium bicarbonate alone.

These statements in no way limit the application of my invention, and the specific oils mentioned must be regarded each as typical of a class.

The products from fatty oils suitable for the manufacture of lacquers and varnishes are obtained by the processes of application Ser. No. 143,786, in particular from tung oil, linseed oil, castor oil, sunflower oil, fish-blubber and the like.

The amount of modifying agent used according to my invention is normally from 2 to 10 per cent by weight on the starting materials. I find that the degree of modification of the final product increases as more modifying agent is employed. It is not necessary to use more than 30 per cent, nor in the case of salts is it usually possible to dissolve more than this proportion.

I have observed that those modifying agents are most effective which according to Frumkin's method (see e. g. Z. physikalische Chemie, 1924, 109, 34–49 and later papers) impart a negative surface charge to a liquid in which they are dispersed.

The effectiveness of the modifying agents employed in my processes such as described in my Ser. No. 143,786 and other applications ante, is appreciably greater when they are applied in the colloidal condition for example by dispersion in the oil by means of some form of mill.

The modifying process may be accelerated, not only by radiation as mentioned in the said application Ser. No. 143,786, but also by making the mixture of oil and electrolyte part of an electric circuit; that is, by subjecting the mixture to electric potential. By the vulcanization of my modified oil-products, I have obtained substances which yield new types of lacquers and varnishes. Also, various combinations of vulcanized and unvulcanized oil products and resin products may be used. For instance, a resin product may be vulcanized and used with an unvulcanized oil product or a vulcanized oil product may be used with an unvulcanized resin product. Again a mixture of an oil product and a resin product may be vulcanized together or a solution of such a mixture in a suitable solvent may be treated with a vulcanizing agent. For the vulcanization of my modified products I may use sulfur, sulfur chloride or other reagents for introduction of sulfur.

With sulphur chloride vulcanization occurs in the cold, and this reagent is also suitable for the vulcanization of solutions of the oil-products or resin-products. The injurious action of free hydrogen chloride evolved when sulphur chloride is used must be prevented by addition of neutralizing agents or other suitable means. For instance an inorganic oxide or hydroxide e. g. calcium oxide or calcium hydroxide, or an organic amine may be mixed into the modified oil or resin products before vulcanization. Or such neutralizing agents may be added to the vulcanizing agent prior to its use. In some cases the vulcanization may be effected prior to the addition of the neutralizing agent. In such cases also the above mentioned neutralizing agents may be used. Also the addition of an unsaturated organic substance, such as turpentine oil, is sometimes advantageous. The injurious effects of the free hydrogen chloride may also be prevented by passing a gas through the pulverized vulcanized product or through its solution in a suitable solvent either alone or admixed with or saturated with the vapors of volatile basic substances such as ammonia or trimethylamine or with volatile unsaturated hydrocarbons.

Also sulphur may be used to vulcanize my modified fatty oil products as described in my said applications. In doing so, those products mixed with the sulphur and heated to temperatures sufficient for vulcanization until a product having the desired properties is obtained.

Vulcanization accelerators such as piperidine pentamethylenedithiocarbamate, tetramethyl-thiuram disulphide, heptaldehydeaniline, mercaptobenzthiazole, and antioxidants such as p-aminophenol, hydroquinone, compounds obtained by condensing alpha and beta naphthylamines or mixtures of these bodies with aldehydes (see U. S. Patent No. 1,777,352) may be added if desired. Such additions are included in my prior specification as "purely organic bodies." Activators such as zinc oxide may also be added.

The vulcanized products are valuable for varnishes and lacquers, giving films which are very elastic, fast to weathering, and suitable for stoving. After stoving they exhibit a high degree of resilience and hardness. The character of the varnishes and lacquers may be varied by varying the temperature of vulcanization, the proportion of sulphur, the nature of quantity of accelerator and activator, and further by the addition of fillers; e. g. when gas black is applied as a filler the ageing properties of the varnish films are improved accordingly.

In the practice of the present invention, I first modify the fatty oil by heating it in the presence of a minor amount of the modifying agent to temperature above 200° C. until a modified, heat-bodied oil product is obtained and then subsequently vulcanized the product so obtained.

In producing the modified, heat-bodied oils, I may employ various salts and other modifying agents mentioned in my said prior applications, using from 2 to 10 parts of the modifying agent to 100 parts of the oil by weight. Sometimes, one per cent or less may be used. The amount used varies with the particular agent and the modification desired. Generally, the amount does not exceed 30 per cent on the oil, and in most cases less than 20 per cent.

Usually I employ metal salts such as disclosed in my Serial No. 143,786 and 359,425, although the organic modifying agents disclosed in my Ser. No. 359,425 and 446,170 are sometimes used, in the first step of the present processes. I find that the alkali metal salts of weak acids are advantageous for the present purposes, for instance, the carbonates, sulphites or sulphides of sodium which develop non-oxidizing gases during the heating, to wit, $CO_2$, $SO_2$ and $H_2S$ respectively. Other modifying agents which likewise develop gases other than oxygen under the conditions of reaction may be used. However, my invention is not limited to the use of such modifying agents.

I may use other electrolytes or polar compounds as the modifying agent and, if desired, simultaneously pass a current of a non-oxidizing gas, such as $CO_2$, $SO_2$, $H_2S$ etc. through the oil during the heating as described in my prior applications. That is, I may effect the first step of the present processes in any of the particular ways shown in said prior applications. Generally, I employ polymerizing temperatures substantially above 200° C., such as temperatures between 250 and 350° C., in preparing the modified, heat-bodied oils and temperatures between 270° and 310° C. are advantageous. Likewise, it is advantageous to effect the heating of the oil under reduced pressure or vacuum, that is, pressures less than atmospheric and out of contact with the air. By heating in closed vessels and exhausting the gas space to a vacuum equivalent to 25 to 30 inches of mercury, advantageous results are obtained.

In making the "intermediates" (modified, heat-bodied oils) convertible by vulcanization into improved rubber substitutes, I find it advantageous to employ drying oils such as linseed oil, tung oil, rapeseed oil, perilla oil, soya bean oil, cottonseed oil, oiticica oil, sunflower oil, etc. Likewise, fish oils, such as menhaden oil, sardine oil, etc. may be used. In some cases, castor oil or other oils containing unsaturated hydroxylated fatty acids can be used.

Also for this purpose, it is advantageous to use alkali metal salts of weak inorganic acids, of which the following are typical:

Sodium sulfide
    Sodium bisulphite
    Sodium hydrosulphite
    Sodium carbonate
    Sodium bicarbonate Of course, other alkali metal salts such as the potassium lithium etc., salts of the said acids can be employed. When heated these salts evolve gases which are non-oxidizing, as stated hereinbefore. When using these salts as the modifying agent, the heating, that is heat-bodying of the oil should be carried out in stainless steel or glass-lined iron vessels when it is desired to obtain the lightest colored products.

In making the said "intermediates," heating in the presence of the modifying agent, such as a metal salt, is continued until upon cooling there is attained heavily bodied viscous liquids or semisolid oil products which will melt or fuse at vulcanizing temperatures. These intermediates can be stored until it is desired to vulcanize them, in which case the intermediate can be first fused or melted by heating it to vulcanizing temperature and then adding the sulphur. Again the process may be practiced as a continuous one, the hot bodied oil being partially cooled to vulcanizing temperature and then the sulfur added and the reaction continued at that temperature until the improved rubber substitute is obtained.

I have further discovered that the dissolution of the "electrolytes" or other modifying agents in the starting-materials is very appreciably facilitated by the addition of certain "auxiliary agents" or "sensitizers." These fall into two groups, namely the purely inorganic e. g. silica gel, fuller's earth, and the purely organic e. g. formaldehyde, phenol, thiocarbanilide, benzidine hexamethylenetetramine, 2:3 hydroxynaphthoic acid, alphanaphthol, quinoline, pyrogallol, benzene, glycerol and phthalamide. The specific examples of auxiliary agents here mentioned are to be taken as typical of the substances which have been successfully used for this purpose and not as comprising all the effective substances. It should be mentioned that some electrolytes, and quite a number of the new modifying agents disclosed in my Ser. No. 359,425 act as auxiliary agents or sensitizers, when used in conjunction with other modifying agents. Thus, e. g. the dissolution of 5 per cent of sodium bisulphite in linseed oil is facilitated and the color of the product is made lighter by the addition of say 2 per cent of such compounds as amino-azobenzene sulphate, aniline sulphate, nitrocresyl carbonate, dimethyl sulphate, trichloracetic acid, benzene-sulphonic acid, iodoform, naphthalene tetrachloride, pinene hydrochloride, m-xylidinesulphonic acid, $\beta$-naphthylamine-6:8 disulphonic acid, $\beta$-naphthylamine 6-sulphonic acid, acetyl chloride, p-nitroacetanilide, chloral hydrate, and triphenyl phosphate. Naphthalene-1-sulphochloride, oxalic acid, diphenylamine hydrobromide, amino-salicylic acid, pale cresylic acid, 2:6 naphthalene-disulpho acid, o-dichlorbenzene.

The advantages of a rapid dissolution of the modifying agent are greatest in those cases where a clear, pale or colorless product is desired, especially for example, for the varnish industry. They are also important in the manufacture of oil products for the rubber industry, and are very manifest in the case of fatty oils to be treated with metal organic salts, carbonates, sulphides, sulphites, hydrosulphites, thiosulphates, or halides.

Plasticizers may be added to the starting-materials, or during or after the process of modification, in order to obtain a softer final product. These plasticizers may be purely organic, e. g. glycerol, phenol, or partly organic and partly inorganic, e. g. tricresyl phosphate.

In vulcanizing my modified bodied oils, I generally employ from 10 to 50 parts of sulphur to 100 parts of bodied oil by weight and temperatures between 120° and 180° C. Temperatures between 120° and 140° C. are advantageous and are ordinarily employed in the second step of my present two-step method for making improved vulcanized oils or rubber substitutes. In order to facilitate the incorporation with the bodied oil (intermediate) of the sulphur or of the accelerator and activators mentioned ante, it is advantageous to mix them with sufficient raw drying oil to form a paste and add the paste to the fused or melted bodied oil at vulcanizing temperature. For instance, the sulphur paste can be prepared by grinding sulphur in raw linseed oil in the ratio of 2 parts sulphur to 1 of oil by weight. In making the activator or accelerator pastes equal parts of oil and zinc oxide (activator) or mercaptobenzthiazole, etc. (accelerator) may be used.

The following examples are given by way of illustration of various aspects of the invention and as indicating various methods of carrying it into effect:

*Example 1*

300 parts of linseed oil are heated with 15 parts of sodium bisulphite in an open vessel fitted with a stirrer, and two metal electrodes. A potential difference of 200–250 volts is maintained between the electrodes, and the temperature raised to 300° C. After 3 hours at this temperature the resulting product is thicker than that obtained by heat treatment of linseed oil in the absence of the electric field, all other conditions being the same.

If the experiment is carried out in a closed flask with a vacuum of 25–30 inches of mercury at 250° C. a similar result is obtained. Thickening of the oil occurs more readily in the presence of an electric field than without it.

230 volts direct current electrodes ½ inch apart.

*Example 2*

150 parts of linseed oil are heated under vacuum to 290–310° C. for 5 hours with a mixture of 7½ parts of sodium bisulphite and 3 parts of fuller's earth. The resulting product is a moderately soft solid, but harder than that obtained by the heat treatment of linseed oil with 7½ parts of sodium bisulphite alone and under the same conditions.

If in this example the fuller's earth is replaced by dimethyl aniline or glycerol, very similar results are obtained. If glycerol is used it also acts to some extent as a plasticizer.

The intermediates obtained in Examples 1 and 2 may be vulcanized with sulphur as described herein and improved rubber substitutes obtained. Likewise in preparing the intermediate, by the procedure given in these examples, with sodium sulphide or other salt in lieu of the sodium bisulphite, other useful intermediates for the production of similar vulcanized modified oil may be obtained.

The following example is another illustration of the manufacture of my improved rubber substitutes.

Example 3

200 gms. of fish oil are heated with 10 gms. of sodium bisulphite at 250°–270° C. under a vacuum of 20–30 inches of mercury for 3 hours. The product is subsequently vulcanized at 140° C. with 80 gms. of sulphur (using 4 gms. of zinc oxide as an accelerator).

In this example sodium sulphide may be substituted in lieu of the sodium bisulphite.

Example 4

1000 parts of raw linseed oil and 50 parts of sodium hydrosulphite are heated to 300° C. in a closed stainless steel vacuum kettle under vacuum of 20 to 25 inches. The heating is continued for 5 hours. Upon cooling to room temperature, a stiff, light brown fusible solid is obtained which melts between 70° and 120° C.

To produce an improved rubber substitute from the above intermediate, 1000 parts of the intermediate are fused in an open kettle by heating to 120° C. and 100 parts of sulphur, 20 parts of zinc oxide and 10 parts of mercaptobenzathiazole are separately added in that oil, each being in the form of a paste with raw linseed oil. The mixture is agitated and held at the vulcanizing temperature of 120° C. until the vulcanization is complete. The hot semi-fluid product so obtained, when cooled to room temperature is light brown elastic solid. This solid is useful as a rubber substitute and is an improved type of softener or plasticizer for rubber mixes and other plastic compositions.

The improved rubber substitutes (vulcanized, modified, heat-bodied fatty oil) of the present invention have the following advantages. They have a much lighter color and a better plasticizing action upon rubber during the compounding process than do the previously known rubber substitutes obtained by simply vulcanizing a fatty oil with sulphur. My improved vulcanized oil product does not decrease the tensile strength of the rubber mixes as do the present commercial vulcanized oils. When vulcanizable rubber compositions containing my improved rubber substitutes are vulcanized, the modified heat-bodied fatty oils become further vulcanized and their plasticizing action is then less. This is desirable.

Example 5

100 parts of linseed oil and 5 parts of sodium sulphite are heated in a manner described in Example 4. 100 parts of the resulting intermediate is vulcanized at 180° C. by the aid of 3 parts of sulphur and 1 part of mercaptobenzathiazole. By this process it is possible to manufacture a very light colored and transparent rubber substitute with low specific gravity. It can be advantageously used in transparent or light colored rubber mixes and where low specific gravity is advantageous.

Example 6

The process of Example 5 is repeated but the heating is stopped before the vulcanization is completed, to form a semi-vulcanized bodied oil. To 200 parts of this semi-vulcanized bodied oil, 50 parts of estergum is added. The mixture is fused together and is diluted with 150 parts of petroleum naphtha to obtain a varnish. The resulting material is useful as a protective coating and also for water proofing fabrics. It may be applied by baking or air-drying. The addition of driers is advantageous in case of air-drying.

That is, by varying the proportion of sulphur or other vulcanizing agent and the time and temperature of vulcanization, I can control the properties of the products obtained. Likewise, by controlling and correlating the modification of the fatty oil in the first step and the subsequent vulcanization thereof, a wide range of vulcanized products having controlled solubility, consistency, melting point, etc., and useful for many purposes can be obtained.

For instance, my vulcanized products are useful in the tanning, finishing and water-proofing of leather and also in finishing and water-proofing textiles, paper and other fibrous materials. Being thermoplastic, they may be applied in various ways. Also they may be applied to such materials in the form of aqueous emulsions or of solutions in organic solvents. Also, my solid vulcanized products are useful as plasticizers for synthetic rubbers and synthetic materials having rubber-like properties, such as those sold under the trade names, "Neoprene," "Thiokol," etc., as well as for rubber, itself. Further, my solid vulcanized products being thermoplastic and having rubber-like properties, themselves, can be directly used in making plastic compositions and milled or mixed with fillers, pigments, etc., on heated rolls or in suitable blade mixers. They are generally useful in plastic and liquid coating compositions.

Having described my invention and various illustrative embodiments, what I claim is:

1. The process which comprises mixing a fatty oil with between 2 and 10 per cent of an alkali metal sulphite, heating the mixture to between 250° and 310° C. until a thickened, heat-bodied, polymerized oil product is obtained and then subsequently vulcanizing the modified, heat-bodied oil product so obtained.

2. The process of claim 1 wherein said sulphite is sodium bisulphite.

3. The process of claim 1 wherein said fatty oil is linseed oil.

4. The process of claim 1 wherein said fatty oil is a fish oil.

5. The process of claim 1 wherein said heating is effected under a vacuum equivalent to 25–30 inches of mercury.

6. In the manufacture of vulcanized, modified, heat-bodied fatty oils useful as rubber substitutes, the improvement which comprises effecting the said heat-bodying of the fatty oil at a polymerizing temperature in the presence of an electrolyte to obtain a modified, heat-bodied, polymerized oil product and subsequently vulcanizing said oil product to further modify its properties and to further solidify it.

7. The two-step process of bodying and modifying fatty oils which comprises first heating the oil in the presence of a minor amount of a polar compound, at a polymerizing temperature and for a time sufficient to partially polymerize and heat-body and thereby modify it and then vulcanizing the modified, partially heat-bodied fatty oil with sulphur under heat sufficient to effect substantial vulcanization and further alteration of the properties of said bodied oil.

8. The process of claim 7 wherein the said polar compound is a metal salt of a weak acid.

9. The process of claim 7 wherein the said polar compound is one capable of developing a non-oxidizing gas during said heating.

10. A two-step process, for making improved vulcanized oil products useful as plasticizers in rubber and other plastic compositions, which comprises mixing a fatty oil with at least 2 per cent of a metal salt of an inorganic acid, heating the mixture to a polymerizing temperature above 200° C., under vacuum until a thickened, heat-bodied polymerized oil product is obtained and then mixing the said modified, heat-bodied oil product with sulphur and heating the mixture to a vulcanizing temperature until a vulcanized, modified, heat-bodied oil product is obtained.

11. The process of claim 10 wherein the bodied oil is vulcanized by heating it to vulcanizing temperature and then adding the sulphur to the hot oil in the form of a paste.

12. The two-step process of bodying and modifying fatty oils which comprises first heating the oil in the presence of a polar compound, at a polymerizing temperature of at least 200° C. and for a time sufficient to partially polymerize and heat-body and thereby modify it and then vulcanizing the modified, partially heat-bodied fatty oil with sulphur under heat sufficient to effect substantial vulcanization and further alteration of the properties of said bodied oil.

13. A two-step process, for making improved vulcanized oil products useful as plasticizers in rubber and other plastic compositions, which comprises mixing a fatty oil with at least 2 per cent of a metal salt of an inorganic acid, heating the mixture to a polymerizing temperature above 200° C. until a thickened, heat-bodied polymerized oil product is obtained and then mixing the said modified, heat-bodied oil product with sulphur and heating the mixture to a vulcanizing temperature until a vulcanized, modified, heat-bodied oil product is obtained.

14. The process of claim 1 wherein said mixture of fatty oil and alkali metal sulphite is heated to polymerizing temperatures, in the presence of about 2 per cent of fuller's earth as an auxiliary agent.

15. In the manufacture of vulcanized, modified, heat-bodied products from fatty glycerides containing unsaturated carbon compounds, the improvement which comprises effecting the said heat-bodying in the presence of an electrolyte capable of facilitating the said bodying by heat and of altering the internal structure and physical properties of the bodied products so obtained, the electrolyte being present in an amount greater than 1 per cent and being dispersed in the heat-bodied product and associated with the dispersed phase thereof, and subsequently vulcanizing the modified, heat-bodied product so obtained to further modify its properties and to further solidify it.

16. The two-step process of bodying and modifying organic isocolloids capable of being modified by heat and of being vulcanized with sulphur, which comprises first heating the said isocolloid in the presence of a polar compound, at a temperature and for a time sufficient to partially body and modify it and then vulcanizing the modified partially heat-bodied product with sulphur under heat sufficient to effect substantial vulcanization and further alteration of the properties of said product.

17. The process which comprises mixing a fatty oil with at least 2 per cent of a metal salt of an inorganic acid, heating the mixture to temperatures above 200° C. under vacuum until a thickened, heat-bodied oil product is obtained and then mixing the said heat-bodied oil product with sulphur, an organic vulcanization accelerator and an activator and heating the mixture thus obtained to a vulcanizing temperature until a vulcanized, heat-bodied oil product is obtained.

18. In the manufacture of modified products from organic isocolloid substances containing unsaturated carbon compounds and capable of being altered by heating, said modified products having a body, solidifying point and other physical properties different from those of the original isocolloid substance, the process which comprises mixing said isocolloid with at least 2 per cent of a polar compound capable of effecting the relations between the phases of the isocolloid, heating the mixture to at least 200° C., continuing the said heating until the internal structure of the isocolloid is sufficiently altered to change said physical properties, and then vulcanizing the modified product thus obtained to further change its properties.

LÁSZLÓ AUER.